United States Patent [19]
Jang

[11] Patent Number: 5,560,218
[45] Date of Patent: Oct. 1, 1996

[54] CONTROL APPARATUS AND METHOD FOR AN AIR CONDITIONER

[75] Inventor: Hyun G. Jang, Suwon, Rep. of Korea

[73] Assignee: Samsung Electronics Co., LTD., Suwon, Rep. of Korea

[21] Appl. No.: 319,816

[22] Filed: Oct. 7, 1994

[30] Foreign Application Priority Data

Nov. 26, 1993 [KR] Rep. of Korea ............... 1993-25321

[51] Int. Cl.$^6$ ............................................. F25B 27/00
[52] U.S. Cl. .................... 62/228.4; 62/230; 62/236; 62/235.1; 323/906
[58] Field of Search .................. 62/236, 230, 235.1, 62/208, 209, 228.1, 228.4; 323/906; 307/21, 22, 20, 24, 25, 26

[56] References Cited

U.S. PATENT DOCUMENTS

| | | | |
|---|---|---|---|
| 4,620,140 | 10/1986 | Chonan | 323/906 X |
| 4,697,136 | 9/1987 | Ishikawa | 323/906 X |
| 4,999,560 | 3/1991 | Morishima et al. | 323/906 X |
| 5,375,429 | 12/1994 | Tokizaki et al. | 62/230 X |

FOREIGN PATENT DOCUMENTS 4-198648   7/1992   Japan .

*Primary Examiner*—Harry B. Tanner
*Attorney, Agent, or Firm*—Burns, Doane, Swecker & Mathis, L.L.P.

[57] ABSTRACT

A compressor motor of an air conditioner is powered by A.C. power from an invertor. In a first mode of operation, the power comprises a combination of a commercial A.C. power source and a solar battery. In a second mode of operation, i.e., a cost-efficiency mode, the frequency of power supplied to the motor is varied to ensure that the motor is powered solely by power derived from the solar battery when such power is above a reference value.

2 Claims, 3 Drawing Sheets

CONTROL APPARATUS AND METHOD FOR AN AIR CONDITIONER

FIELD OF THE INVENTION

The present invention is related to a control apparatus and method for an air conditioner employing a commercial A.C. power source and a solar battery, and particularly to a control apparatus and method for an air conditioner for making the most efficient use of the electric power from the solar battery.

DESCRIPTION OF THE PRIOR ART

Recently, various kinds of electric appliances have been developed which employ a solar battery as a supplementary power source to a commercial A.C. power source.

As is well known, solar energy is so immense that the radiation energy reaching the surface of the earth amounts to 2 cal/cm$^2$ a minute.

A solar battery is used for converting the solar energy to electric energy. The solar battery is formed of a semiconductor crystal, the surface of which comprises a P-N junction. While sunlight radiates on the surface of the solar battery, electric current flows from the P-type area to the N-type area in the solar battery.

The more intense the sunlight, the larger the electric current flowing from the solar battery. As for the present state of the art, it is known that the open circuit voltage of a solar cell is as much as several hundreds millivolts, and electric power generated by a solar panel of square meter is as much as about one kilowatt.

FIG. 1 is a block diagram schematically illustrating the electric parts of a conventional air conditioner employing the solar battery as a supplementary power source.

As shown in FIG. 1, the electrical parts of a conventional air conditioner comprise a solar cell module 1 for converting solar energy to electric energy, a first filter 2 for removing high frequency noise components contained in the electric power (about D.C. 100 volts) generated by the solar cell module 1, a DC/DC convertor 3 for outputing D.C. voltage (about D.C. 280 volts) by successively performing the operations of converting the D.C. voltage output from the first filter 2 to A.C. voltage with a higher frequency, stepping up the converted A.C. voltage and smoothing the stepped up A.C. voltage. A PWM controller 7 is provided for controlling the on-off period of switching elements (not shown) included in the DC/DC convertor 3. A second filter 4 for removing high frequency noise components contained in the D.C. voltage output from the DC/DC convertor 3 and supplying it to the air conditioner, especially to a compressor motor.

In FIG. 1, the reference character C1 is a condenser for smoothing the wave form of the D.C. voltage output from the second filter 4, and the reference character 6 denotes a commercial A.C. power source connected with the solar cell module 1.

By the way, the quantity of electric energy converted from solar energy is rather little due to the fact that the density of solar energy is low in nature. As for the present state of the art, the quantity of electric energy obtainable by a solar cell panel of three square meter is as little as at most 500 watts per hour, for example, at the summer solstice at which the density of solar energy is highest.

Electric power more than 2 kilo watts per hour is normally required for operating the air conditioner, which makes it impossible to operate the air conditioner with only the electric power generated by the solar cell module 1. Accordingly, the commercial A.C. power source 6 is mainly used to operate the air conditioner 5, and the electric power generated by the solar cell module 1 is supplementarily used.

On the other hand, another air condition system for raising the utilization efficiency of the electric power generated by the solar battery is fully disclosed in Japanese patent laid-open publication No. 198648 (Jul. 7, 1992). The disclosed air conditioner system adds D.C. power obtained from a solar battery to another D.C. power converted from the commercial A.C. power source, converts that D.C. power into A.C. power with a variable operation frequency, and then drives a compressor motor with the converted A.C. power.

In the afore-mentioned configuration, current flowing through the compressor motor is held below a predetermined value by appropriately varying the frequency of the converted A.C. power, thereby preventing any possible damage to the compressor motor due to overcurrent.

However, the electric power generated by the solar battery can only be used while the air conditioner is in operation otherwise the solar battery as well as the commercial A.C. power source is not used. As a consequence, the conventional air conditioner has a shortcoming in that the no cost electric energy generated by the solar battery is not used at all when the air conditioner is not in operation.

SUMMARY OF THE INVENTION

It is an object of a present invention is to provide a control apparatus and method for an air conditioner employing a commercial A.C. power source and a solar battery, for making the most of the electric power generated by the solar battery.

It is another object of the present invention to provide a control apparatus and method for an air conditioner employing a commercial A.C. power source and a solar battery, for providing agreeable environment by operating the air conditioner only with the D.C. power generated by the solar battery with the air conditioner is in an "off" mode, in other words, the user does not want to consume the charged commercial A.C. power.

It is still another object of the present invention to provide a control apparatus and method for an air conditioner employing a commercial A.C. power source and a solar battery, for rapidly lowering the temperature in the space to be air-conditioned of an area occupied by the air conditioner.

To achieve the objects, the control apparatus of an air conditioner comprises a means for producing a first D.C. power from a commercial A.C. power source; a means for producing a second D.C. power from a solar battery; a compressor motor forming a part of a refrigeration cycle; an invertor means for converting the first and second D.C. power to A.C. power with a variable operation frequency, and then driving the compressor motor with the converted A.C. power; a means for sensing intensity of sunlight; a means for detecting the magnitude of the output voltage of the second D.C. power; and, a control means for calculating the magnitude of the second D.C. power by multiplying current corresponding to the sensed intensity of sunlight by the output voltage of the second D.C. power and controlling the invertor means to drive or stop the compressor motor on the basis the calculated second D.C. power.

The control apparatus may further comprise a means for detecting the magnitude of current flowing through the invertor means and a control means for calculating the power consumption of the commercial A.C. power source and for varying the operation frequency of the A.C. power output from the invertor means to drive the compressor motor only with the second D.C. power battery, thereby making the most of the electric power generated by the solar battery.

In the control apparatus described above, the control means may be preferably embodied by a single microprocessor.

On the other hand, the control method of the present invention may be preferably adapted to an air conditioner, which converts a first D.C. power produced from a commercial A.C. power source and a second D.C. power produced from a solar battery into A.C. power with a variable frequency, and then drives a compressor motor with the converted A.C. power. The control method comprises the steps of calculating the magnitude of the second D.C. power while the air conditioner is in "off" mode; comparing the magnitude of the second D.C. power with a reference power with which the compressor motor may be driven at the minimal frequency; driving the compressor motor at the minimal frequency when the second D.C. power is greater than the reference power; and stopping the compressor motor when the second D.C. power is less than the reference power.

In the control method described above, the calculation of the magnitude of the second D.C. power may be preferably performed by multiplying current corresponding to the intensity of sunlight by output voltage of the second D.C. power.

The control method may further comprise the steps of calculating the magnitude of the power consumption in the commercial A.C. power source when the second D.C. power is greater than the reference power, and varying the operation frequency of the compressor motor so that the only second D.C. power may be used.

BRIEF DESCRIPTION OF THE DRAWINGS

The present invention will become more readily apparent from the following description in connection with the accompanying drawings wherein.

DETAILED DESCRIPTION OF THE PREFERRED EMBODIMENT

For a better understanding of the present invention, together with other and further objects, advantages and capabilities thereof, reference is made to the following disclosure in connection with the above-described drawings.

Hereinafter, the explanation will be developed by taking an illustration of an air conditioner which can preform cooling and heating operations, and whose indoor and outdoor units are separated.

Figure 2:
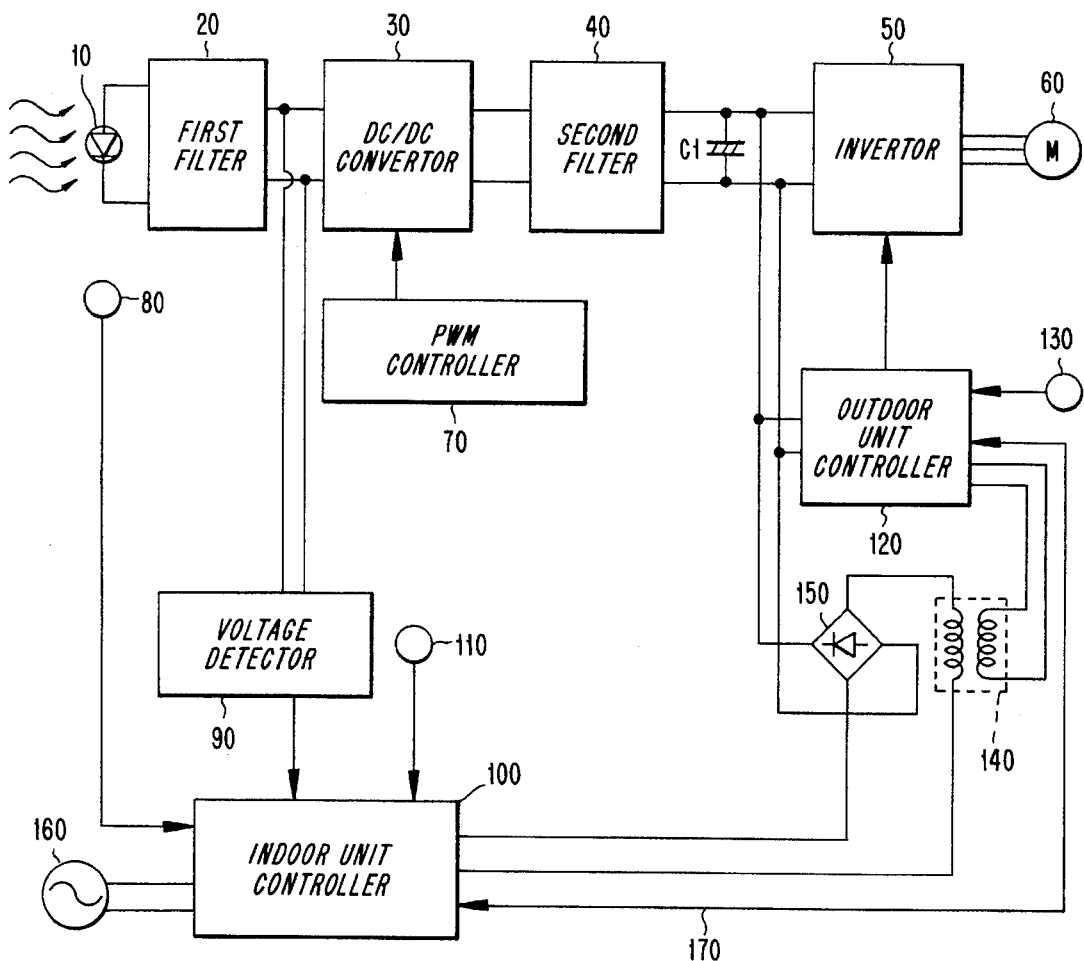
FIG. 2 is a block diagram schematically illustrating a control apparatus for an air conditioner according to the present invention; and, FIGS. 3A and 3B are flow chart explaining the control method for an air conditioner of the present invention.

FIG. 2 is a block diagram schematically illustrating a control apparatus for an air conditioner.

Figure 1:
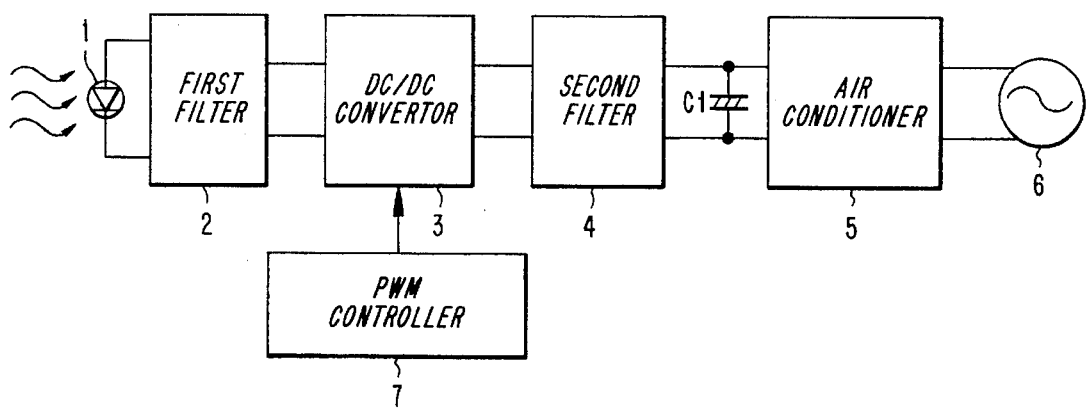
FIG. 1 is a block diagram schematically illustrating the electric parts of a conventional air conditioner employing a solar battery as a supplementary power source.

Referring to FIG. 2, the reference characters 10 through 40, and 70 respectively denote a solar cell module, a first filter, a DC/DC convertor, a second filter, and a PWM controller, which have the same configurations and functions as denoted by the reference characters 1 to 4, and 7 in FIG. 1. For the sake of being brief, any further description of these parts will be omitted.

An indoor unit controller 100 comprises a microprocessor and well known peripheral elements, which receive a temperature signal from an indoor temperature sensor 110, and then perform the necessary control on the basis of the temperature signal.

A light intensity sensor 80 senses the intensity of sunlight, and then transmits it to the indoor unit controller 100. The more intense the sunlight, the larger the current flowing from the solar cell module 10. The indoor unit controller 100 stores a table for converting the sensed light intensity to current.

A voltage detector 90 detects the magnitude of the voltage output from the first filter 20, and then transmits it to the indoor unit controller 100. The indoor unit controller 100 calculates the magnitude of the second D.C. power by multiplying the current corresponding to the sensed light intensity by the output voltage from the first filter 20.

An outdoor unit controller 120 comprises a microprocessor and well known peripheral elements, which receive a temperature signal from an indoor temperature sensor 130, and then perform the necessary control on the basis of the temperature signal. The outdoor unit controller 120 exchanges various information, such as the indoor and outdoor temperatures, with the indoor unit controller 100 through a data bus 170.

A bridge rectifier 150 generates a first D.C. power by full-wave rectifying the commercial A.C. power source 160, and then supplies an invertor circuit 50 with the first D.C. power in parallel with the second D.C. power.

The invertor circuit 50 converts the first and second D.C. power into A.C. power with three phases, whose frequency is variable by switching elements (not shown), and drives the compressor motor 60 with the converted A.C. power. The switching operation of the invertor circuit 50 is controlled by the outdoor unit controller 120.

A current transformer 140 detects the magnitude of current flowing through the bridge rectifier 150, and then provides the outdoor unit controller 120 with it.

Hereinafter, the operation of the control apparatus of the present invention will be explained in detail along with the control method of the present invention.

Figure 3A:
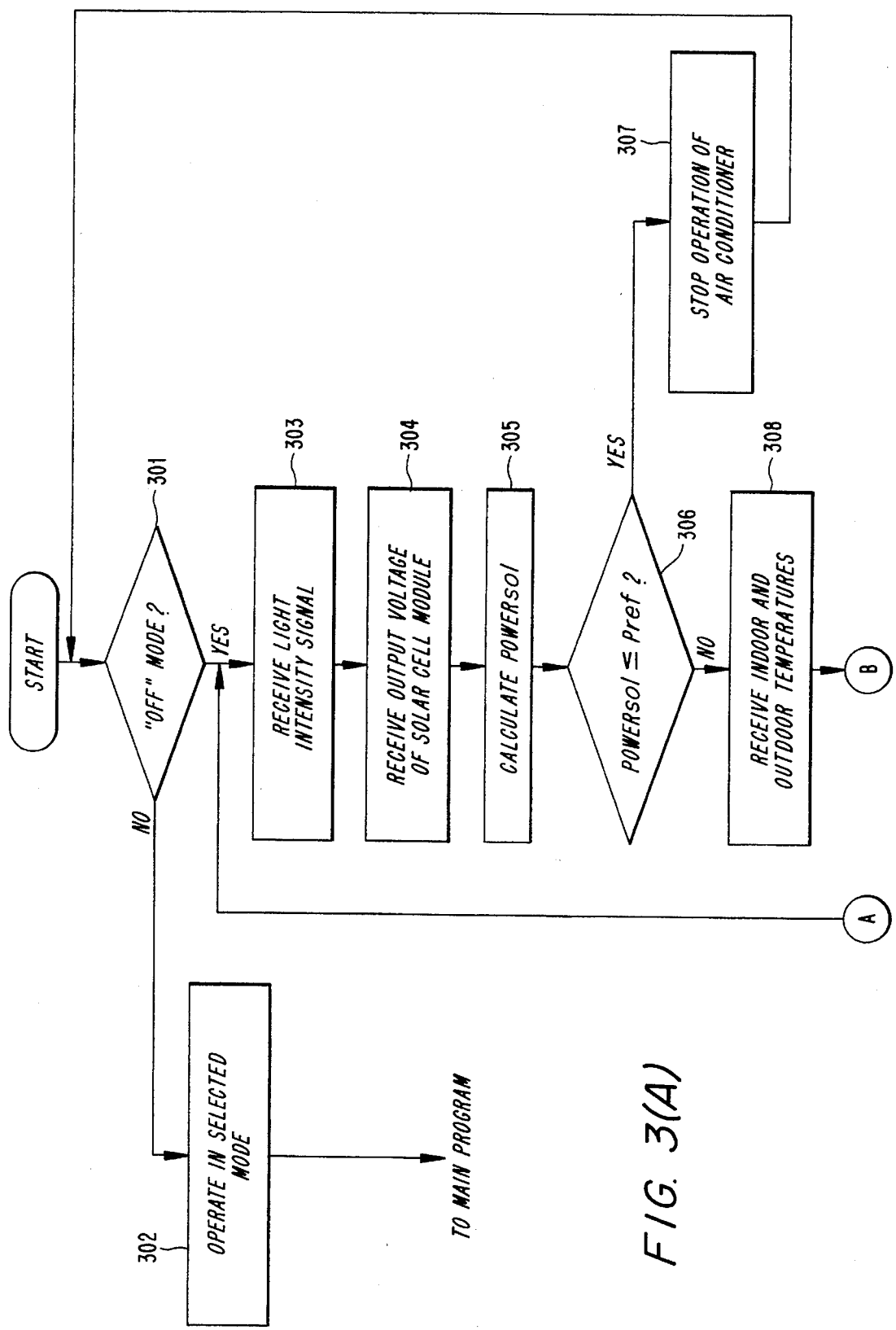
Figure 3B:
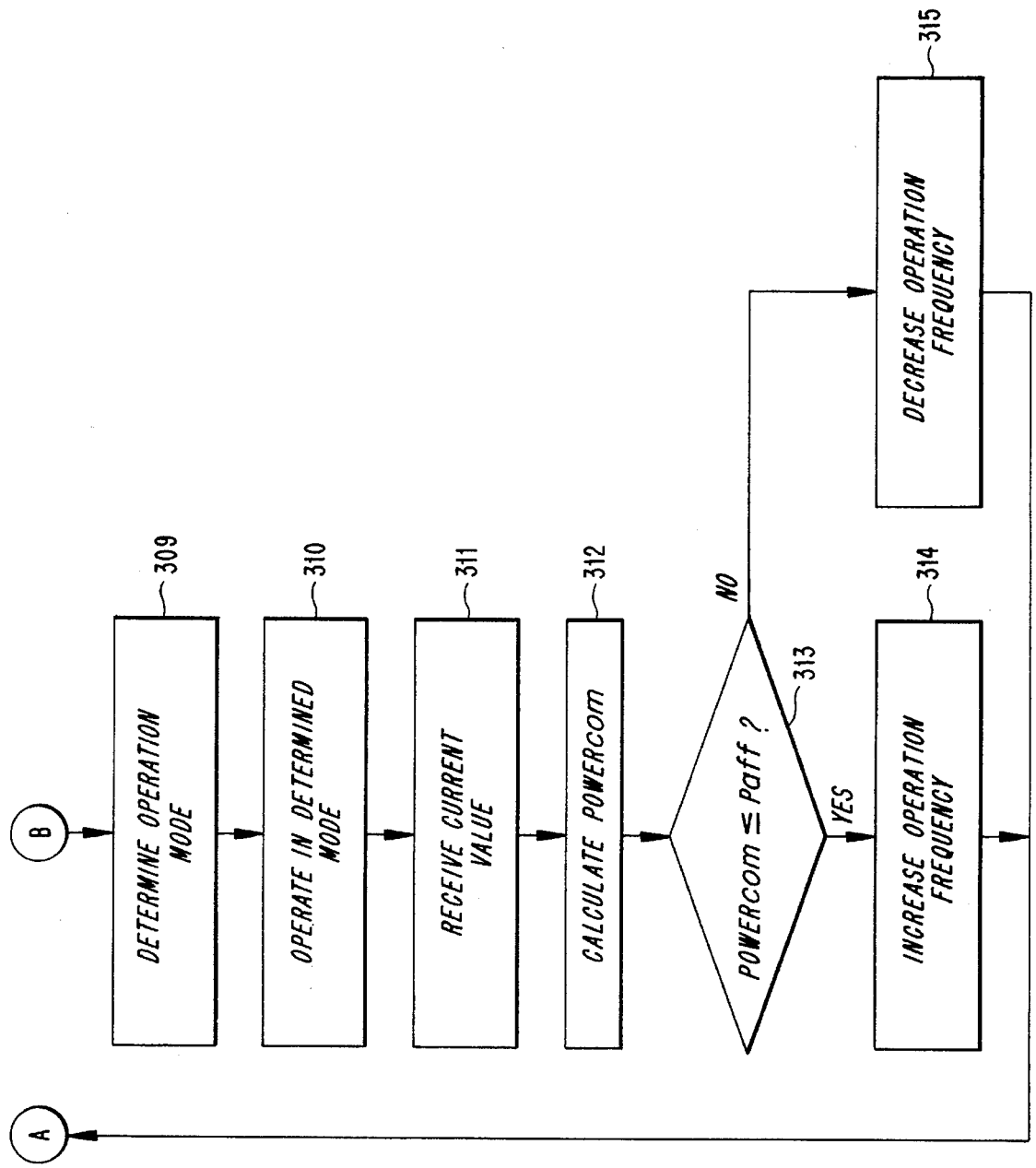

FIGS. 3A and 3B are flow charts explaining the control method for an air conditioner of the present invention.

Referring to FIGS. 3A and 3B, the air conditioner is operated according to the operation mode and so on, selected by the user while the commercial A.C. power source 160 is applied to the air conditioner.

In step 301, it is determined whether or not the user selects the "off" mode, in other words, the user does not want to consume the costly commercial A.C. power while the air conditioner is in operation. If the "off" mode is selected in step 301, the program proceeds to step 302, in which the air conditioner is continuously operated according to the selected operation mode.

On the other hand, if "off" mode is selected in step 301, the program proceeds to step 303, in which a light intensity signal is input from the light intensity sensor 80.

In step 304, the output voltage of the solar cell module 10 is input from the voltage detector 90.

In step 305, the indoor unit controller 100 reads out a current value corresponding to the light intensity signal from the conversion table, and calculates the magnitude (POWERsol= V×I) of the D.C. power of the solar cell module 10 (i.e., available power from the solar cell module) by multiplying the read out current value by the voltage value input in step 304.

In step 306, it is determined whether or not the D.C. power (POWERsol) of the solar cell module 10 is greater than a reference power (Pref), where the reference power (Pref) is the D.C. power for operating the air conditioner at the minimal frequency. If the D.C. power (POWERsol) is not greater than the reference power (Pref) in step 306, the air conditioner can not be operated only with the solar cell module 10. Thus, the program proceeds to step 307, in which the air conditioner is held in the "off" mode.

If the D.C. power (POWERsol) is greater than the reference power (Pref) in step 306, the program proceeds to step 308, in which the temperature data are input from the indoor and outdoor sensors 110 and 130.

In step 309, an appropriate operation mode is determined on the basis of the temperature data.

In step 310, the air conditioner is operated in either a cooling mode or a heating mode according to the determination result of step 309.

In step 311, the current value flowing through the bridge rectifier 150 is input from the current transformer 140 while the air conditioner is operated in the determined mode.

In step 312, the magnitude of commercial A.C. power (POWERcom) consumed in driving compressor motor 60 is calculated by multiplying the current value detected in step 311 by the output voltage of the commercial A.C. power source 160.

In step 313, it is determined whether or not such calculated power consumption of the commercial A.C. power source 160 is less than a reference power (Paff), where the reference power (Paff) is of a magnitude for determining whether or not the commercial A.C. power is being consumed in driving the compressor motor 60. The reference power (Paff) may be determined within several tens watts.

When the commercial A.C. power consumption (POWERcom) is less than the reference power (Paff) in step 313, that means that the D.C. power (POWERsol) generated by the solar cell module 10 is not being fully used. Accordingly, the program proceeds to step 314, in which the operation frequency of the A.C. power output from the invertor 50 increases bit by bit until the commercial A.C. power (POWERcom) increases up to the reference power (Paff).

When the commercial A.C. power consumption (POWERcom) is not less than the reference power (Paff) in step 313, that means that the commercial A.C. power is excessively used to drive the compressor motor 60. Accordingly, the program proceeds to step 315, in which the operation frequency decreases bit by bit until the commercial A.C. power consumption (POWERsol) decreases down to the reference power (Paff).

By the method described above, the D.C. power generated by the solar cell module 10 may be all used to drive the compressor motor 60 while minimizing the commercial A.C. power consumption.

I claim:

1. A method of driving a compressor motor of an air conditioner, comprising the steps of:
   A) producing a first D.C. power from a commercial A.C. power source;
   B) producing a second D.C. power from a solar battery;
   C) combining said first and second D.C. powers and converting same to A.C. power; and
   D) providing means for establishing:
      D1) a first operating mode in which said A.C. power derived from the combination of said first and second D.C. powers is supplied to said compressor motor to operate the compressor motor at a predetermined frequency, and
      D2) a second operating mode for operating the compressor motor solely by power from said solar battery by:
         D2a) comparing an available power of said solar battery with a reference value,
         D2b) maintaining said compressor motor in an off condition when said available power does not exceed said reference value, and
         D2c) varying an operating frequency of said compressor motor when said available power exceeds said reference value, to bring said operating frequency to a level that can be achieved by said available power.

2. The method according to claim 1, wherein step D2a) includes determining sunlight intensity, and multiplying a current corresponding to said sunlight intensity by an output voltage from said solar battery to determine said available power.

* * * * *